United States Patent
Shimoyama (12)

(10) Patent No.: US 10,899,193 B2
(45) Date of Patent: Jan. 26, 2021

(54) AIR CONDITIONING UNIT FOR VEHICLE

(71) Applicant: DENSO CORPORATION, Kariya (JP)

(72) Inventor: Yohei Shimoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 235 days.

(21) Appl. No.: 15/999,645

(22) PCT Filed: Jan. 25, 2017

(86) PCT No.: PCT/JP2017/002492
§ 371 (c)(1),
(2) Date: Aug. 20, 2018

(87) PCT Pub. No.: WO2017/145617
PCT Pub. Date: Aug. 31, 2017

(65) Prior Publication Data
US 2020/0055368 A1    Feb. 20, 2020

(30) Foreign Application Priority Data

Feb. 22, 2016  (JP) ................................ 2016-031362

(51) Int. Cl.
*B60H 1/34* (2006.01)
*B60H 1/00* (2006.01)
*B60H 1/22* (2006.01)

(52) U.S. Cl.
CPC ..... *B60H 1/00564* (2013.01); *B60H 1/00021* (2013.01); *B60H 1/00528* (2013.01); *B60H 2001/2228* (2013.01)

(58) Field of Classification Search
CPC ............ B60H 1/00564; B60H 1/00021; B60H 1/00528; B60H 2001/2228
USPC ......................................................... 454/152
See application file for complete search history.

(56) References Cited

U.S. PATENT DOCUMENTS

2018/0029441 A1    2/2018  Nakanishi

FOREIGN PATENT DOCUMENTS

| JP | 2007269082 A | 10/2007 |
|----|---|---|
| JP | 2009227026 A | 10/2009 |
| JP | 2012240495 A | 12/2012 |
| WO | WO-2016166957 A1 | 10/2016 |
| WO | WO-2017145618 A1 | 8/2017 |

*Primary Examiner* — Helena Kosanovic
(74) *Attorney, Agent, or Firm* — Harness, Dickey & Pierce, P.L.C.

(57) ABSTRACT

An air conditioning case defines a warm air passage, a cool air passage, a first space, and a second space therein. The cool air passage is in communication with the first space. The warm air passage is in communication with the first space. The second space is connected to the first space on a side of the first space away from the cool air passage. A case interior member including a tunnel member and a blade is arranged in the first space. The tunnel member includes an upstream-end forming portion and a downstream-end forming portion. The upstream-end forming portion is open to the warm air passage. The downstream-end forming portion is open in a direction away from the upstream-end forming portion. The blade extends from the downstream-end forming portion to both sides along a width direction, and guides the air from the tunnel channel to diffuse along the width direction.

8 Claims, 11 Drawing Sheets

AIR CONDITIONING UNIT FOR VEHICLE

CROSS REFERENCE TO RELATED APPLICATIONS

This application is a U.S. National Phase Application under 35 U.S.C. 371 of International Application No. PCT/JP2017/002492 filed on Jan. 25, 2017 and published in Japanese as WO/2017/145617 A1 on Aug. 31, 2017. This application is based on and claims the benefit of priority from Japanese Patent Application No. 2016-031362 filed on Feb. 22, 2016. The entire disclosures of all of the above applications are incorporated herein by reference.

TECHNICAL FIELD

The present disclosure relates to an air conditioning unit for a vehicle that performs air conditioning for a vehicle compartment of the vehicle.

BACKGROUND

Patent Literature 1 discloses an example of such air conditioning units for a vehicle. The air conditioning unit disclosed by Patent Literature 1 includes a case and an air guide. The case defines a warm air passage (or a hot air passage), a cool-air bypass passage (or a cool air passage), and a junction area where the warm air passage and the cool air passage are connected to each other. The air guide is arranged in the junction area.

The air guide may be referred to as a grid. For example, in the air guide, a warm air tunnel, into which air flows from the warm air passage defined in the case, and a path, into which air flows from the cool air passage defined in the case, are arranged side-by-side. With such a configuration, the air guide is configured to reduce a temperature variation or a temperature difference in an up-down direction in air that is discharged from the air conditioning unit.

PRIOR ART LITERATURE

Patent Literature

Patent Literature 1: JP 2009-227026 A

SUMMARY

The air conditioning unit disclosed in Patent Literature 1 is mounted to the vehicle. However, a space accommodating the air conditioning unit is limited in the vehicle. For example, in Patent Literature 1, a distance between the grid as the air guide and an air outlet defined in the case may be short. As such, cool air and warm air, which flows out of the warm air tunnel, may not be mixed with each other sufficiently on a downstream side of the grid in a flow direction of the air. As a result, it may be difficult to reduce the temperature variation in the air discharged from the air conditioning unit.

For avoiding such an abnormality, the warm air tunnel may be divided into a plurality of paths to reduce the temperature variation. However, when the warm air tunnel is divided into a plurality of paths, a pressure loss in the air conditioning unit may increase due to an increase of a ventilation resistance of the grid. As such, a volume of the air discharged from the air conditioning unit may be reduced. At the same time, the grid may cause noise. The above-described facts have been found by the inventors of the present disclosure.

The present disclosure addresses the foregoing issues. Thus, it is an objective of the present disclosure to provide an air conditioning unit for a vehicle that can suppress an increase of a pressure loss in the air conditioning unit caused by a grid and that can reduce a temperature variation in air discharged from the air conditioning unit.

To achieve the above-described objective, an air conditioning unit according to an aspect of the present disclosure is configured to perform an air conditioning for a vehicle compartment and includes an air conditioning case and a case interior member. The air conditioning case defines a warm air passage, a cool air passage, a first space, and a second space therein. The warm air passage allows air to flow therethrough and to be heated in a heater. The cool air passage allows air to flow therethrough while bypassing the heater. The first space is defined on a downstream side of the warm air passage and on a downstream side of the cool air passage. The warm air passage and the cool air passage are connected to each other in the first space. The second space is connected to the first space. The case interior member is positioned in the air conditioning case. The cool air passage is in communication with the first space in one direction. The warm air passage is in communication with the first space in an other direction intersecting with the one direction. The second space is connected to the first space on a side of the first space away from the cool air passage. The air flowing out of the first space is discharged into the vehicle compartment via the second space. The case interior member includes a tunnel member and a blade. The tunnel member defines a tunnel channel therein passing through the tunnel member along a direction intersecting with the one direction. The blade has a wing shape. The tunnel member and the blade are positioned in the first space. The tunnel member includes an upstream-end forming portion that includes an upstream end of the tunnel channel and a downstream-end forming portion that includes a downstream end of the tunnel channel. The upstream-end forming portion is open to the warm air passage. The downstream-end forming portion is open in a direction away from the upstream-end forming portion. The blade extends from the downstream-end forming portion to both sides along a width direction intersecting with both of the one direction and the other direction, and guides the air, which flows out of the tunnel channel from the downstream end, to diffuse along the width direction.

According to the above-described configuration, the tunnel member and the blade can reduce the temperature distribution of the air discharged from the air conditioning unit for a vehicle. Specifically, the blade diffuses the air, which flows out of the tunnel channel from the downstream end, along the width direction. As such, a plurality of narrow tunnel channels may not be necessarily provided to reduce the temperature distribution. Thus, even when the case interior member serving as the above-described grid is mounted, the pressure loss caused by the case interior member can be suppressed.

DESCRIPTION OF EMBODIMENTS

Figure 1:
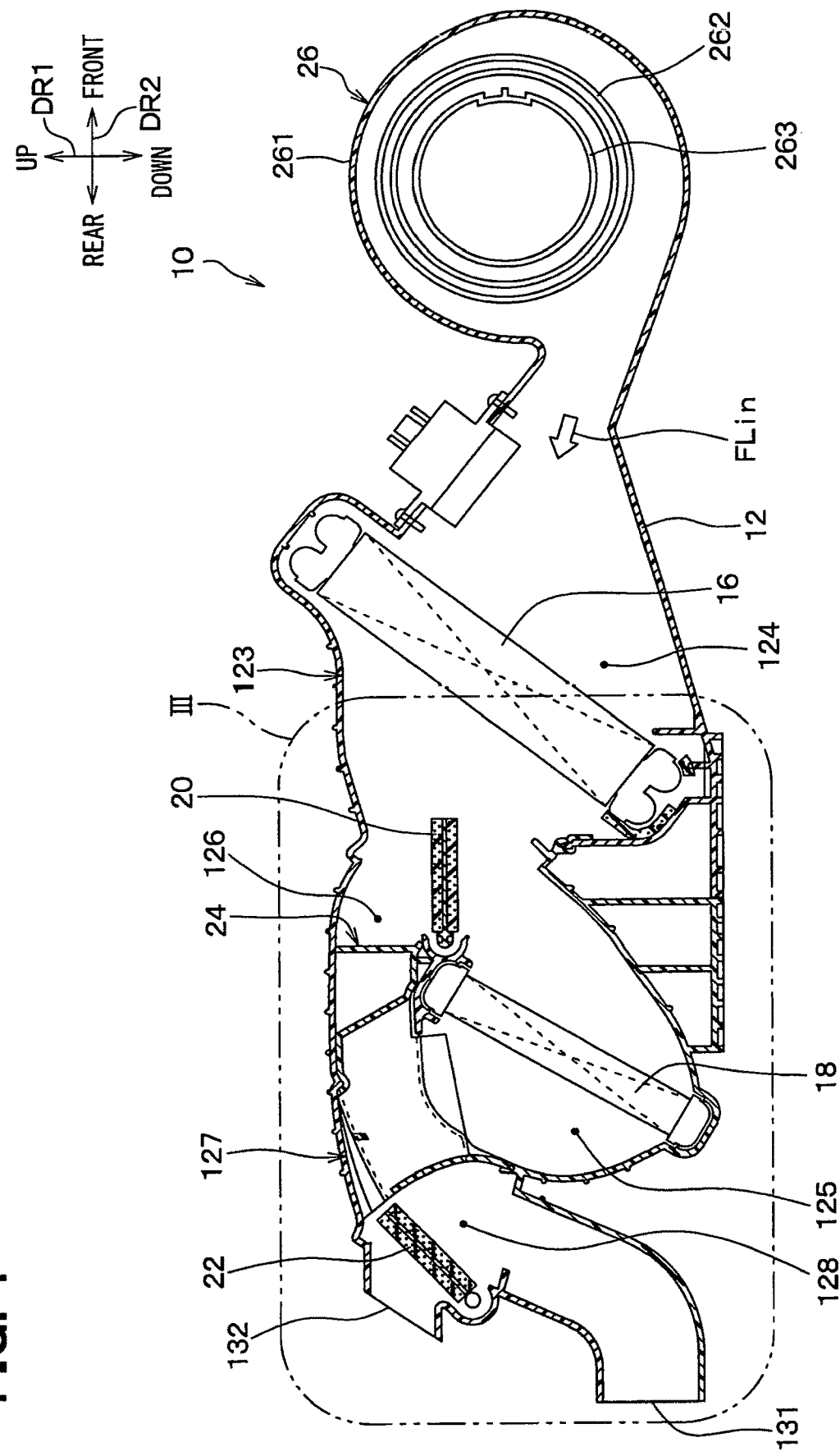
FIG. 1 is a cross-sectional view illustrating a schematic configuration of an air conditioning unit for a vehicle according to a first embodiment.

Hereinafter, embodiments of the present disclosure will be described with reference to the drawings. In the following embodiments, the same or equivalent parts are denoted by the same reference numerals as each other, and explanations will be provided to the same reference numerals.

First Embodiment

Figure 9:
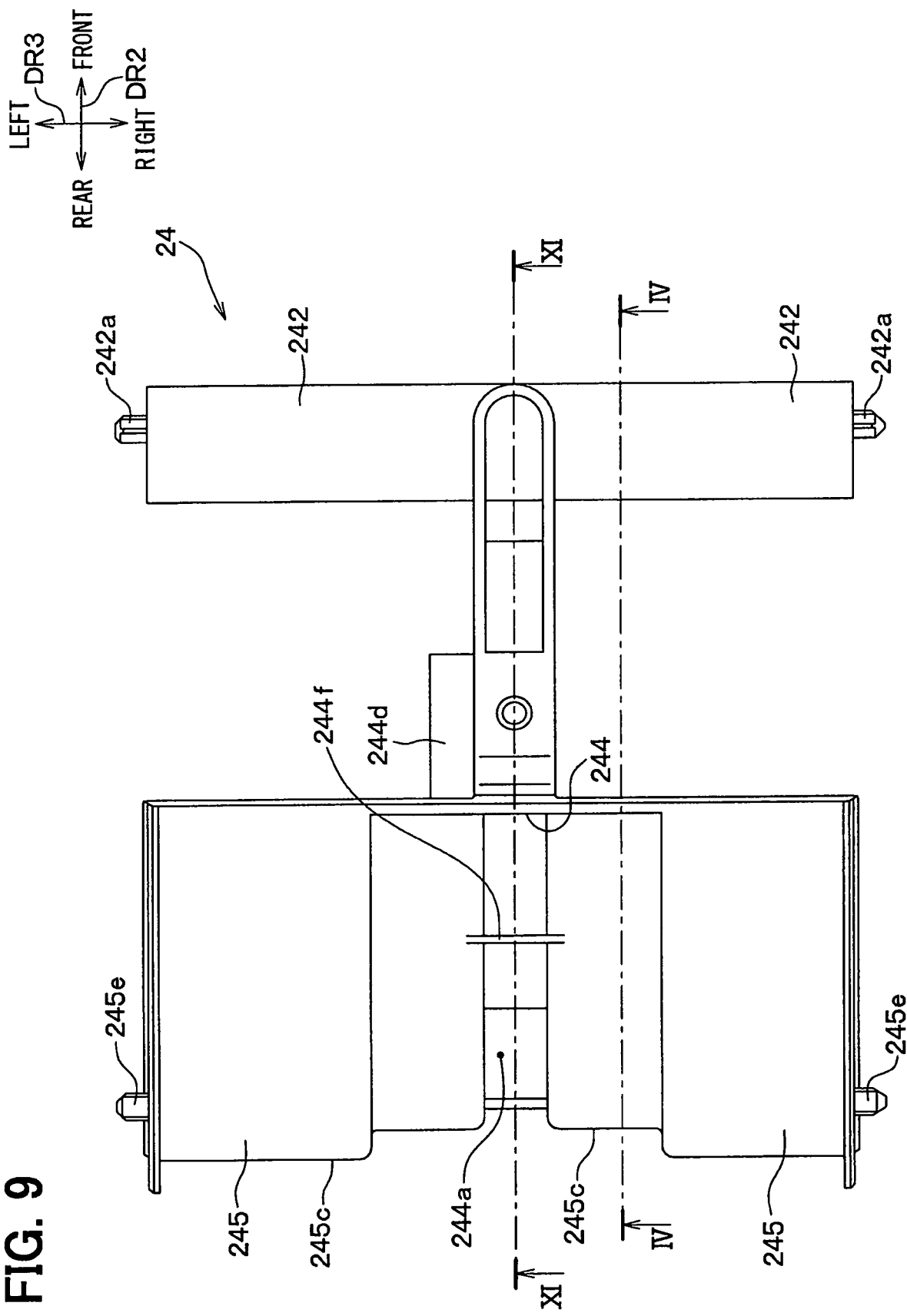
FIG. 9 is a diagram of the grid viewed along an orientation indicator IX shown in FIG. 8, i.e., is a plan view of the grid.

FIG. 1 is a cross-sectional view illustrating a schematic configuration of an air conditioning unit 10 for a vehicle according to the present embodiment. Specifically, FIG. 1 is taken along a line I-I shown in FIG. 2, which is a plan view of the air conditioning unit 10. In other words, FIG. 1 is a cross-sectional view taken at a center of a tunnel channel 244a defined in a grid 24 described later/ The cross-sectional view taken along the line I-I shown in FIG. 2 corresponds to a cross-sectional view taken along a line XI-XI shown in FIG. 9. FIG. 9 is a diagram illustrating the grid 24. In addition, the cross-sectional view taken along the line IV-IV shown in FIG. 2 corresponds to a cross-sectional view taken along the line IV-IV shown in FIG. 9.

Figure 2:
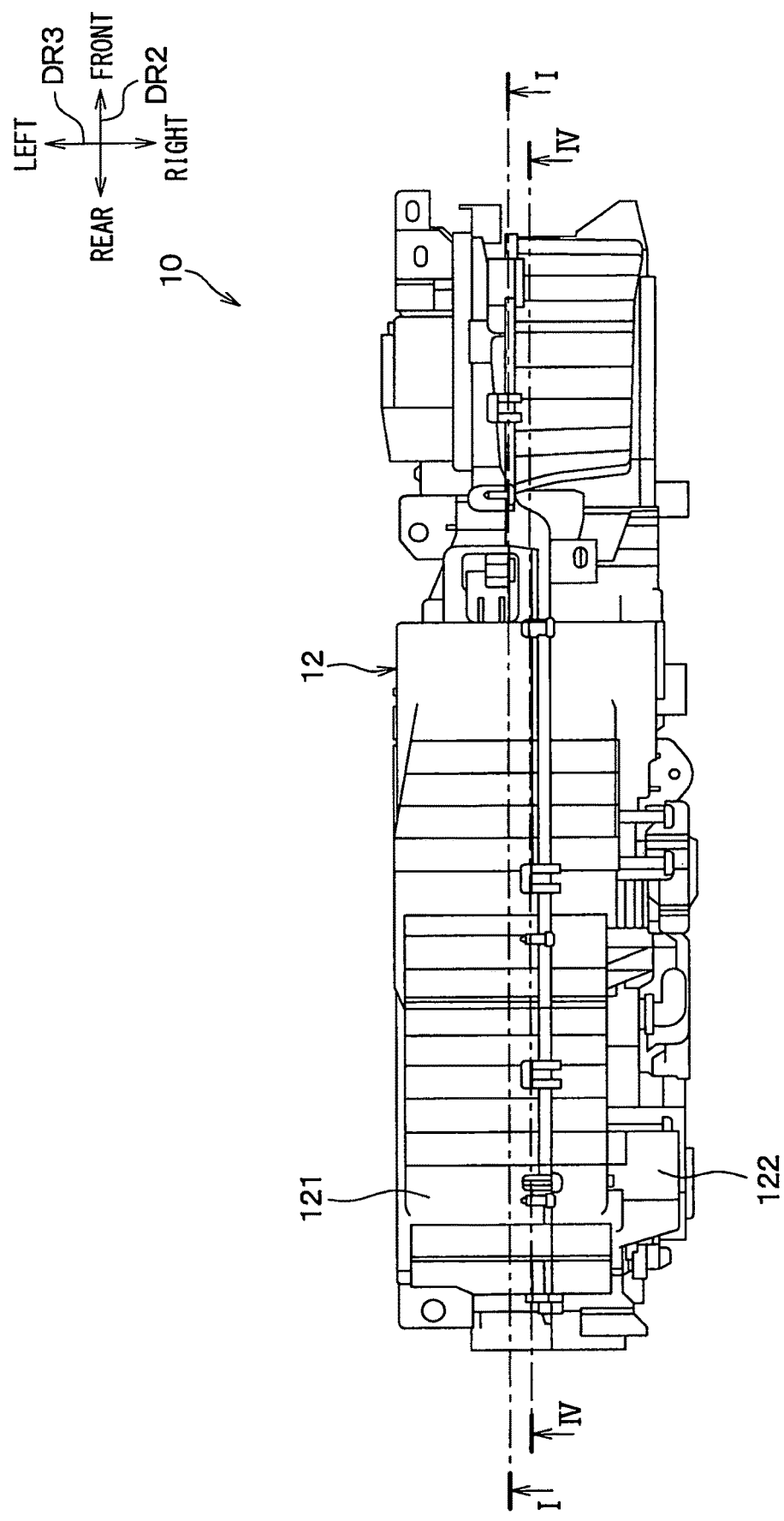
FIG. 2 is a plan view of the air conditioning unit for a vehicle when viewed from an upper side, according to the first embodiment.

For ease of description, orientation indicator DR1, DR2, or DR3 showing the up-down direction, the front-rear direction, and the left-right direction are provided in FIG. 1 and FIG. 2 with the air conditioning unit 10 mounted to the vehicle. That is, the orientation indicator DR1 shows an up-down direction DR1 of the vehicle, and the orientation indicator DR2 shows a front-rear direction DR2 of the vehicle, in FIG. 1. In FIG. 2, the orientation indicator DR3 shows a width direction DR3 of the vehicle. The width direction DR3 is, i.e., a left-right direction DR3 of the vehicle. The up-down direction DR1, the front-rear direction DR2, and the vehicle width direction DR3 intersect with each other, more specifically, are perpendicular to each other.

The air conditioning unit 10 for a vehicle shown in FIG. 1 configures a part of an air conditioner for a vehicle including a compressor and a condenser located outside a vehicle compartment in the vehicle. The air conditioning unit 10 is arranged inside an interior panel of the vehicle compartment and is configured to perform an air conditioning for the vehicle compartment. More specifically, the air conditioning unit 10 serves as an air conditioning unit for a rear seat and is configured to perform air conditioning for a passenger having a rear seat located on a rear side of a front seat including the driver's seat and the passenger's seat.

As shown in FIG. 1, the air conditioning unit 10 for a vehicle includes an air conditioning case 12, an evaporator 16, a heater core 18, an air mix door 20, an outlet door 22, a grid 24, and a blower 26.

The blower 26 is a centrifugal blower. Specifically, the blower 26 is connected to an upstream end of the air conditioning case and is configured to discharge air into the air conditioning case 12. The blower 26 includes a blower case 261, a centrifugal fan 262 in the blower case 261, and a fan motor 263. The blower case 261 is coupled with the air conditioning case 12.

The centrifugal fan 262 draws air and discharges the air when being rotated. The fan motor 263 rotates the centrifugal fan 262. When the centrifugal fan 262 rotates, the blower 26 discharges the air toward the evaporator 16 housed in the air conditioning case 12 as shown by an orientation indicator FLin.

As shown in FIG. 1 and FIG. 2, the air conditioning case 12, together with the blower case 261, configures a housing of the air conditioning unit 10. The air conditioning case 12 is formed by two resin members 121, 122. One of the two members 121, 122 is a first case member 121, and the other of the two members 121, 122 is a second case member 122. The first case member 121 and the second case member 122 are coupled to with each other to form the air conditioning case 12.

The air conditioning case 12 defines, as an air passage, a case passage 123 therein. The case passage 123 allows the air to flow therein toward the vehicle compartment. The case passage 123 is subdivided by a structure provided in the air conditioning case 12. That is, the case passage 123 is divided into an upstream air passage 124, a warm air passage 125, a cool air passage 126, a downstream space 127 as a first space, and a door arrangement space 128 as a second space.

The upstream air passage 124 includes an upstream end connected to an outlet of the blower 26 and a downstream end connected to the warm air passage 125 and the cool air passage 126. That is, the warm air passage 125 and the cool air passage 126 each are connected to the downstream end of the upstream air passage 124 and are in parallel to each other. As such, the cool air passage 126 serves as a bypass passage that allows the air from the upstream air passage 124 to flow therethrough while bypassing the warm air passage 125. In the present embodiment, the cool air passage 126 is located above the warm air passage 125.

The evaporator 16, together with a compressor, a condenser, and an expansion valve (not shown), configures a well-known refrigeration cycle device configured to circulate the refrigerant. The evaporator 16 is configured to cool air passing therethrough by evaporating the refrigerant.

The evaporator 16 is positioned in the upstream air passage 124. That is, the evaporator 16 is a cooling heat exchanger, i.e., a cooler, which is configured to cool the air flowing through the upstream air passage 124. Accordingly, the evaporator 16 cools the air, which flows into the upstream air passage 124 from the blower 26 as indicated by the orientation indicator FLin, and allows the cooled air to at least one of the warm air passage 125 and the cool air passage 126. For example, the evaporator 16 is arranged in the upstream air passage 124 so that all of the air flowing through the upstream air passage 124 passes through the evaporator 16.

The structure of the evaporator 16 is the same as the well-known evaporator used for an air conditioner for a vehicle. Specifically, the evaporator 16 includes a core and a pair of header tanks. The core includes refrigerant tubes and corrugated fins that are stacked alternately. The pair of header tanks connected to both ends of the core portion, respectively.

The heater core 18 is arranged in the warm air passage 125. The heater core 18 is a heating heat exchanger, i.e., a heater, configured to heat the air, which flows out of the evaporator 16 and flows through the warm air passage 125, with engine cooling water. The engine cooling water may be warm water. For example, the heater core 18 is arranged in the warm air passage 125 so that all of the air flowing through the warm air passage 125 passes through the heater core 18.

As such, the air heated by the heater core 18 flows through the warm air passage 125. On the other hand, the cool air, i.e., a cooled air cooled in the evaporator 16, flows through the cool air passage 126 while bypassing the heater core 18.

The structure of the heater core 18 is the same as that of a well-known heating heat exchanger mounted to an air conditioner for a vehicle. Specifically, the heater core 18 includes a core and a pair of header tanks. The core includes warm-water tubes and corrugated fins that are stacked alternately. The pair of header tanks connected to both ends of the core portion, respectively.

Figure 3:
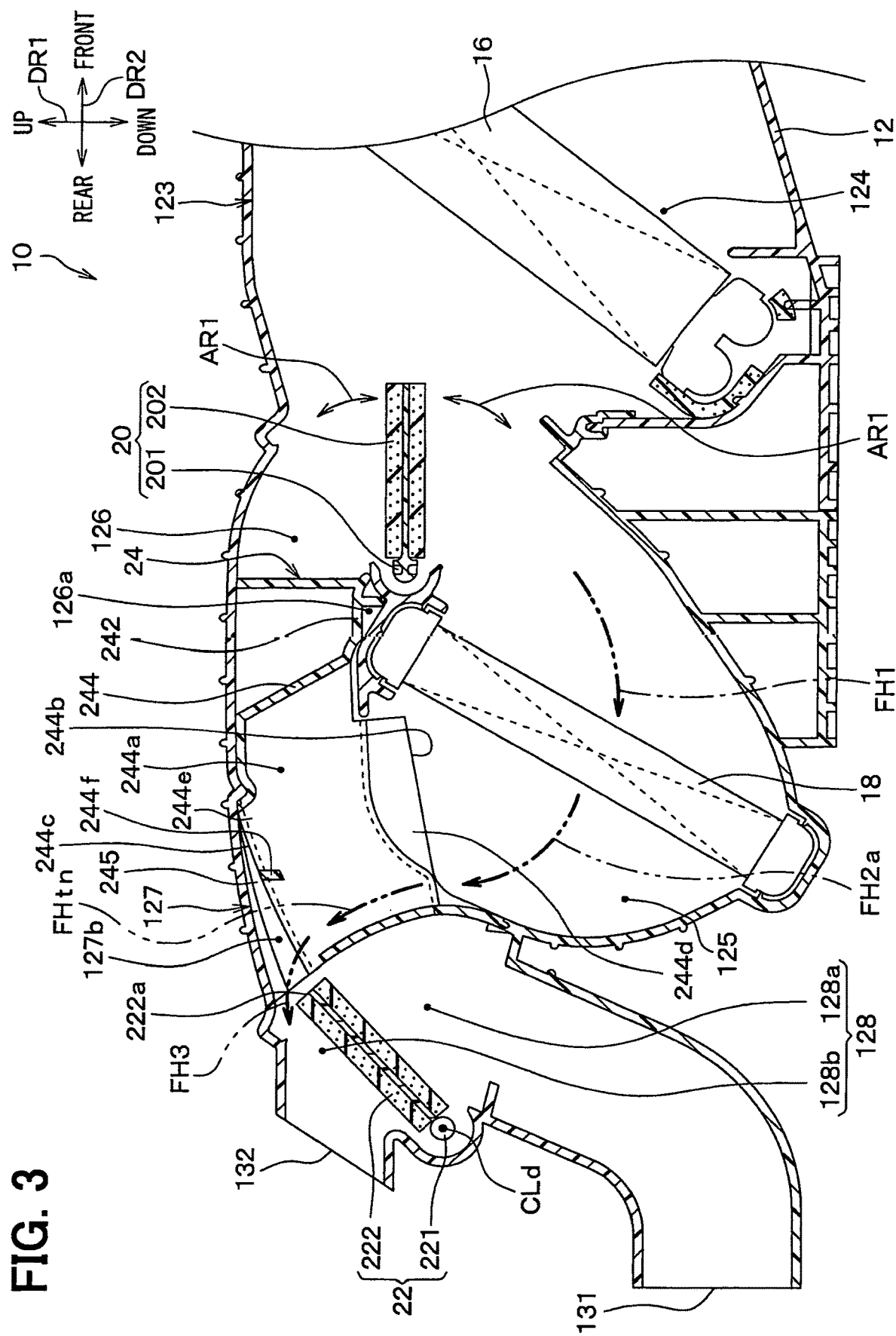
FIG. 3 is an enlarged view of a portion III shown in FIG. 1.

The air mix door 20 is a pivot door arranged in the air conditioning case 12. Specifically, the air mix door 20 is a passage door that opens and closes the warm air passage 125 and the cool air passage 126, and is operated by an electric actuator (not shown). As shown in FIG. 1 and FIG. 3, the air mix door 20 includes a rotary shaft 201 and a door body 202. The rotary shaft 201 extends such that a longitudinal direction thereof is parallel to the vehicle width direction DR3. The door body 202 is a flat plate in shape and is coupled with the rotary shaft 201. The air mix door 20 rotates about the rotary shaft 201 as shown by orientation indicator AR1 so that the door body 202 opens and closes the warm air passage 125 and/or the cool air passage 126 on upstream sides of the warm air passage 125 and the cool air passage 126.

The door body 202 of the air mix door 20 includes a resin plate, which is a flat plate in shape, and a pair of gaskets made of a material such as foamed urethane. The door body 202 has a structure in which the pair of gaskets are attached to both surfaces of the resin plate respectively.

The air mix door 20, which is configured to rotate as shown by orientation indicator AR1, adjusts an air volume ratio between the air flowing through the warm air passage 125 and the air flowing through the cool air passage 126 according to its rotational position. Specifically, the air mix door 20 is configured to move between a maximum cooling position and a maximum heating position consecutively. The air mix door 20 at the maximum cooling position fully closes the warm air passage 125 and fully opens the cool air passage 126. The air mix door 20 at the maximum heating position fully opens the warm air passage 125 and fully closes the cool air passage 126. FIG. 3 shows the air mix door 20 at an intermediate position between the maximum cooling position and the maximum heating position. The air mix door 20 at the intermediate position opens both of the warm air passage 125 and the cool air passage 126.

The maximum cooling position of the air mix door 20 may be referred to as a MAXCOOL position. When the air mix door 20 is at the maximum cooling position, the entire amount of the air after passing through the evaporator 16 flows to the cool air passage 126. That is, the air mix door 20 is positioned at the maximum cooling position during a maximum cooling operation, i.e., a MAXCOOL operation, in which the air conditioning unit 10 for a vehicle performs a cooling operation with the highest efficiency.

The maximum heating position of the air mix door 20 may be referred to as a MAXHOT position. When the air mix door 20 is at the maximum heating position, the entire amount of the air after passing through the evaporator 16 flows to the warm air passage 125. That is, the air mix door 20 is positioned at the maximum heating position during a maximum heating operation, i.e., a MAXHOT operation, in which the air conditioning unit 10 for a vehicle performs a heating operation with the highest efficiency.

The air mix door 20 is configured to be located at the intermediate position between the maximum cooling position and the maximum heating position. When the air mix door 20 is at the intermediate position, the air after passing through the evaporator 16 flows to both of the warm air passage 125 and the cool air passage 126 with a ratio corresponding to the position of the air mix door 20. The warm air, which is heated in the heater core 18 while passing through the warm air passage 125, and the cool air after passing through the cool air passage 126 are mixed with each other in an air mixing space, and then flow into the vehicle compartment. Specifically, the downstream space 127 and the door arrangement space 128 serve as the air mixing space. As such, a temperature of the air, which flows from the blower 26 as shown by orientation indicator FLin, is adjusted according to the position of the air mix door 20, and then the air is discharged into the vehicle compartment as the conditioned air.

The downstream space 127 is defined downstream of the warm air passage 125 and downstream of the cool air passage 126 in the flow direction of the air. The downstream space 127 is connected with each of the warm air passage 125 and the cool air passage 126.

Figure 4:
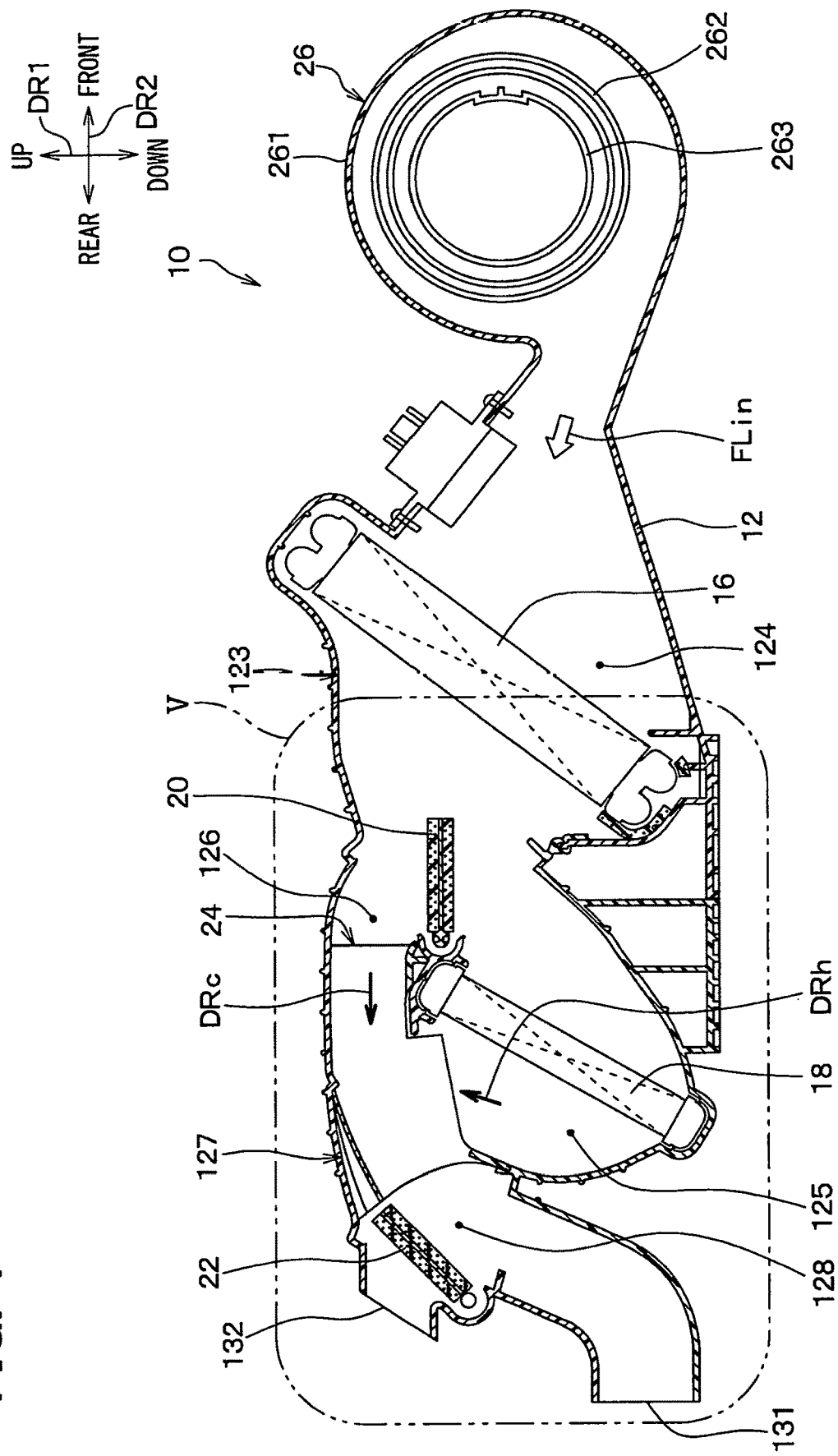
FIG. 4 is a cross-sectional view taken along a line IV-IV shown in FIG. 2, i.e., a cross-sectional view taken at a position outside a tunnel member of a grid.

Specifically, as shown in FIG. 4, the cool air passage 126 is in communication with the downstream space 127 in one direction DRc, i.e., a cool-air-passage connection direction DRc. The warm air passage 125 is in communication with the downstream space 127 in an other direction DRh, i.e., a warm-air-passage connection direction DRh, intersecting with the cool-air passage connection direction DRc.

The outlet door 22 is arranged in the door arrangement space 128. The door arrangement space 128 is connected to the downstream space 127. Specifically, the door arrangement space 128 is defined downstream of the downstream space 127 in the flow direction of the air flowing through the case passage 123. That is, the door arrangement space 128 is connected to the downstream space 127 on a side of the downstream space 127 away from the cool air passage 126. As such, the air flowing out of the downstream space 127 is discharged into the vehicle compartment via the door arrangement space 128.

Figure 5:
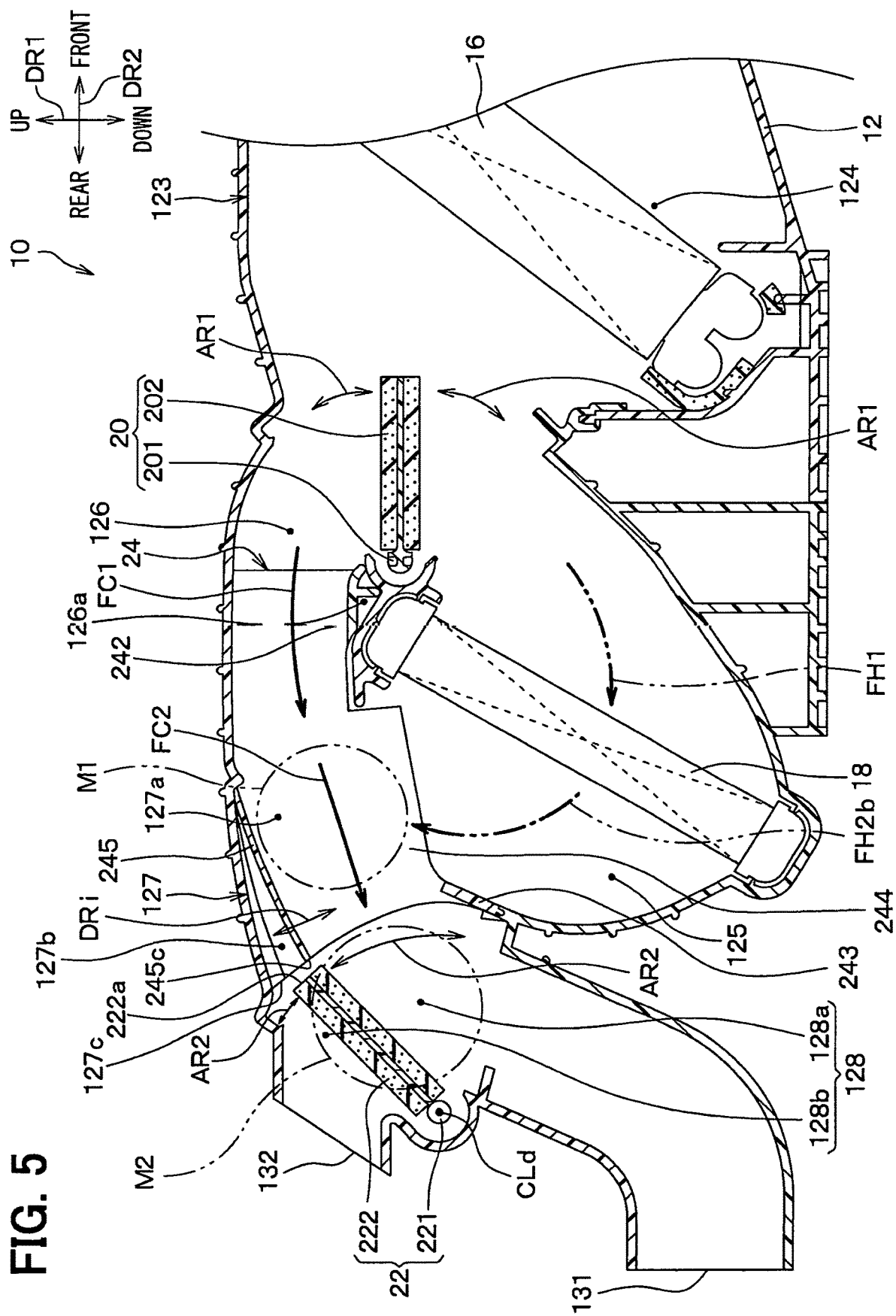
FIG. 5 is an enlarged view of a portion V shown in FIG. 4.

As shown in FIG. 3 and FIG. 5, the air conditioning case 12 is provided with a plurality of air outlets 131, 132 that are configured to discharge air (i.e., the conditioned air), a temperature of which is adjusted, into the vehicle compartment. The air outlets 131, 132 each are connected to the door arrangement space 128 so that the conditioned air after passing through the door arrangement space 128 is discharged into the vehicle compartment via at least one of the air outlets 131, 132.

For example, the air outlets 131, 132 may be a foot outlet 131 as a first air outlet and a face outlet 132 as a second air outlet. The foot outlet 131 discharges the conditioned air toward feet of an occupant having a rear seat. The face outlet 132 discharges the conditioned air toward an upper body of the occupant having the rear seat.

The face outlet 132 is positioned above the foot outlet 131 in the air conditioning case 12. As such, a junction where the face outlet 132 is connected to the door arrangement space 128 is located above a junction where the foot outlet 131 is connected to the door arrangement space 128.

The face outlet 132 is connected to the door arrangement space 128 on a side of the door arrangement space 128 away from the downstream space 127 in the cool-air-passage connection direction DRc shown in FIG. 4. Accordingly, the cool air passage 126, the downstream space 127, the door arrangement space 128, and the face outlet 132 are arranged in this order along the cool-air-passage connection direction DRc. That is, the structure inside the air conditioning case 12 has a layout in which the cool air, i.e., air flowing through the cool air passage 126, flows from the cool air passage 126 to the face outlet 132 linearly.

The outlet door 22 is a second space door positioned in the door arrangement space 128, i.e., the second space. The outlet door 22 rotates inside the door arrangement space 128. For example, the outlet door 22 may be a pivot door having a similar configuration to the air mix door 20 and may be operated by an electric actuator (not shown). The outlet door 22 is positioned upstream of the foot outlet 131 and the face outlet 132 in the flow direction of air.

The outlet door 22 includes a rotary shaft 221 and a door body 222. The rotary shaft 221 has a door rotational axis CLd parallel to the vehicle width direction DR3. The door body 222 is a plate in shape and is connected to the rotary shaft 221. The door body 222 is configured to rotate about the door rotational axis CLd as shown by orientation indicator AR2. The outlet door 22 with the door body 222 rotated opens and closes the foot outlet 131 and the face outlet 132.

For example, the door body 222 of the outlet door 22 may have the similar configuration to the door body 202 of the air mix door 20. The door body 222 of the outlet door 22 includes a resin plate, which is a flat plate in shape, and a pair of gaskets made of a material such as foamed urethane. The door body 222 has a structure in which the pair of gaskets is attached to both surfaces of the resin plate respectively.

Further, the outlet door 22 is a cantilever door mechanism in which a base edge of the door body 222 is connected to the rotary shaft 201. The door body 222 of the outlet door 22 includes a door edge 222a positioned between the door rotational axis CLd and the downstream space 127. In the present embodiment, the door edge 222a of the door body 222 is positioned between the door rotational axis CLd and the downstream space 127, regardless of a rotational position of the outlet door 22 within an operation range between a foot mode position and a face mode position described later.

The rotational position of the outlet door 22 is set correspondingly to blowing modes that are performed by the air conditioning unit 10 for a vehicle selectively. For example, the blowing modes of the air conditioning unit 10 for a vehicle include the foot mode, the face mode, and the bi-level mode.

In the foot mode, the conditioned air is discharged from the foot outlet 131 mainly. In the face mode, the conditioned air is discharged from the face outlet 132 mainly. In the bi-level mode, the conditioned air is discharged from both of the foot outlet 131 and the face outlet 132.

For example, when the air conditioning unit 10 for a vehicle is operated in the foot mode, the outlet door 22 is at the foot mode position to close the face outlet 132 and to fully open the foot outlet 131.

When the air conditioning unit 10 for a vehicle is operated in the face mode, the outlet door 22 is at the face mode position to fully open the face outlet 132 and to close the foot outlet 131.

When the air conditioning unit 10 for a vehicle is operated in the bi-level mode, the outlet door 22 is at an intermediate position between the face mode position and the foot mode position. FIG. 1, FIG. 3, FIG. 4 and FIG. 5 shows the outlet door 22 at the bi-level mode.

As described above, the air conditioning case 12 is configured to discharge the conditioned air that is provided by mixing the warm air from the warm air passage 125 and the cool air form the cool air passage 126. The grid 24 is mounted so as to reduce a temperature difference in the conditioned air in the vehicle up-down direction DR1 and a temperature variation in the conditioned air.

Figure 6:
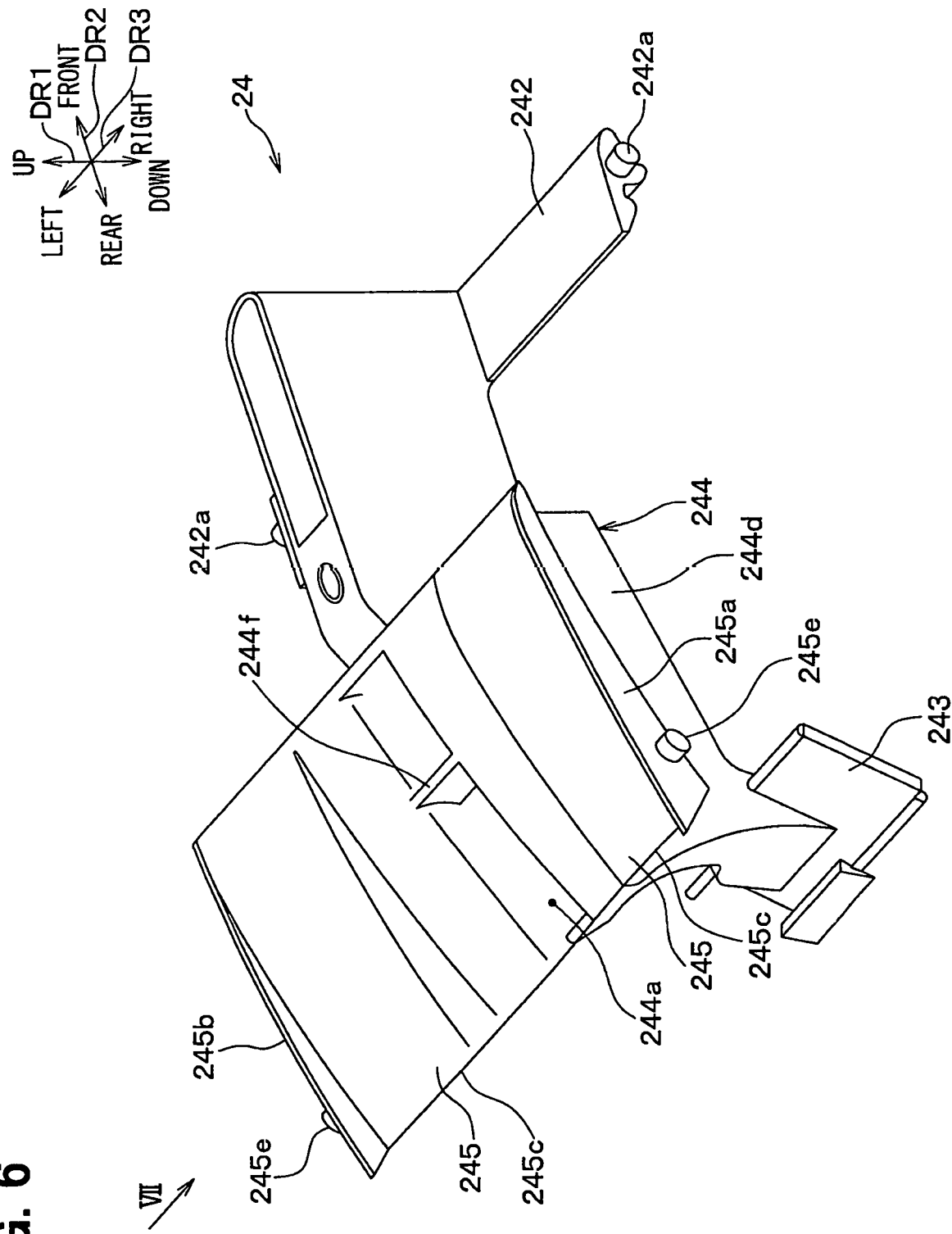
FIG. 6 is a first perspective view of the grid of the air conditioning unit according to the first embodiment.
Figure 7:
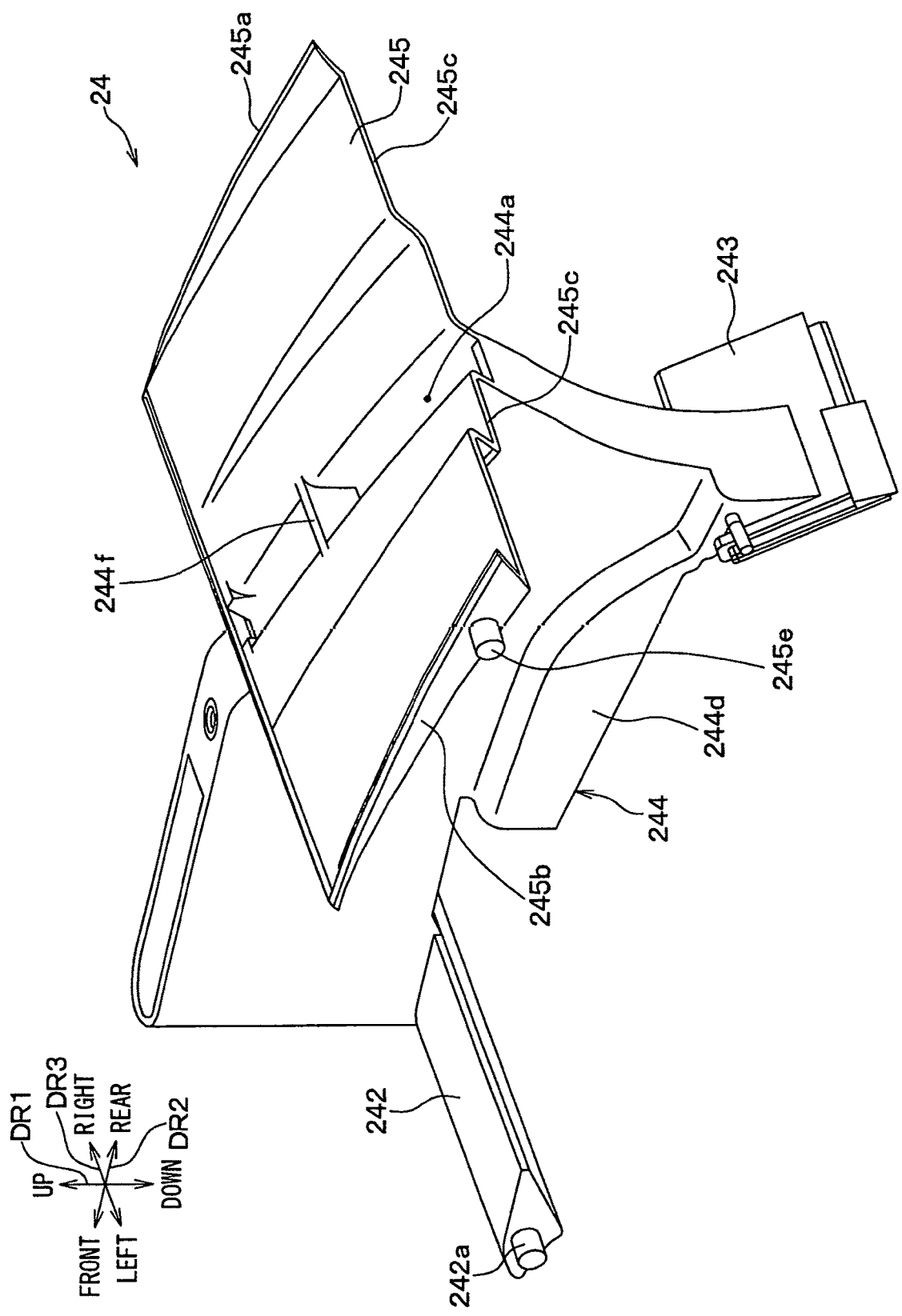
FIG. 7 is a second perspective view of the grid when viewed along an orientation indicator VII shown in FIG. 8.
Figure 8:
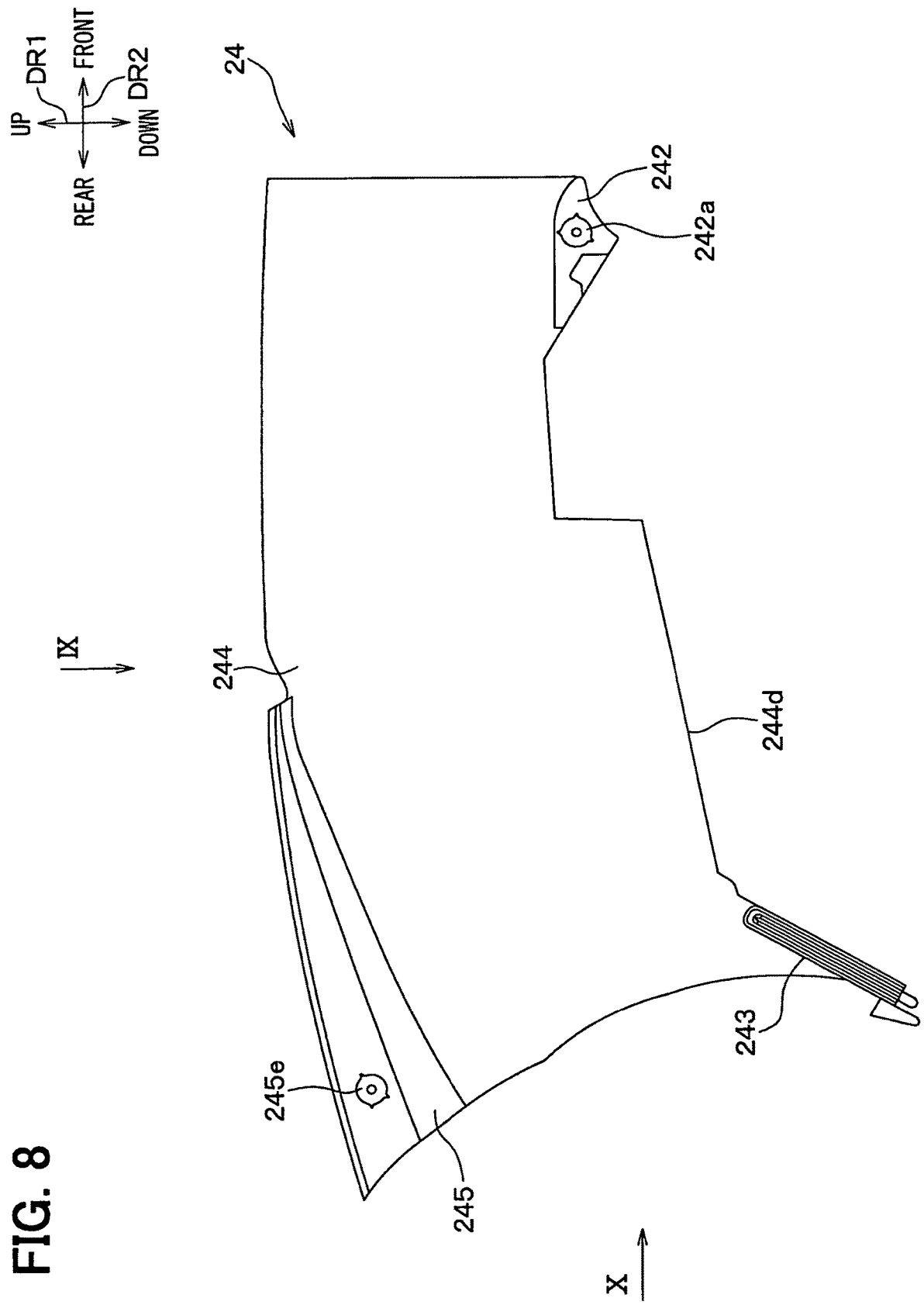
FIG. 8 is a front view of the grid in the same direction as shown in FIG. 1, according to the first embodiment.

As shown in FIG. 3 and FIG. 5, the grid 24 in the case passage 123 extends across the cool air passage 126 and the downstream space 127. In other words, the grid 24 is a case interior member that is arranged in the air conditioning case 12. FIG. 6 and FIG. 7 each are a perspective view showing the grid 24 alone.

As shown in FIG. 3, FIG. 6 and FIG. 7, the grid 24 includes a first support portion 242, a second support portion 243, a tunnel member 244 as a warm air tunnel, and a blade 245. The first support portion 242, the second support portion 243, the tunnel member 244, and the blade 245 are formed integrally with each other. For example, the grid 24 may be made of resin. In this case, the first support portion 242, the second support portion 243, the tunnel member 244, and the blade 245 are molded all together.

The first support portion 242 is coupled to the tunnel member 244 on an upstream of the tunnel member 244 along the flow direction of the air flowing through the case passage 123. The first support portion 242 fixes the tunnel member 244 to the air conditioning case 12. The first support portion 242 is arranged inside a recessed portion 126a defined in a part of the cool air passage 126.

The first support portion 242 includes a pair of bosses 242a on both sides of the first support portion 242 in the vehicle width direction DR3. The pair of bosses 242a each protrude from the first support portion 242 along the vehicle width direction DR3. The first support portion 242 is fixed to the air conditioning case 12 by inserting the bosses 242a into fitting holes (not shown) defined in the air conditioning case 12.

The blade 245 includes a pair of bosses 245e as well similar to the first support portion 242 with the bosses 242a. The blade 245 is fixed to the air conditioning case 12 by inserting the bosses 245a into fitting holes (not shown) defined in the air conditioning case 12.

The second support portion 243 is coupled with a lower portion of the tunnel member 244 and fixes the tunnel member 244 to the air conditioning case 12.

Specifically, the tunnel member 244 of the grid 24 defines a tunnel channel 244a therein passing through the tunnel member 244 along a direction intersecting with the cool-air-passage connecting direction DRc shown in FIG. 4. The tunnel channel 244a includes an upstream end 244b and a downstream end 244c, and allows the warm air from the warm air passage 125 to flow from the upstream end 244b to the downstream end 244c as shown by orientation indicator FHtn.

As shown in FIG. 3 and FIGS. 6 to 11, the tunnel member 244 includes an upstream-end forming portion 244d and a downstream-end forming portion 244e. The upstream-end forming portion 244d defines the upstream end 244b of the tunnel channel 244a. The downstream-end forming portion 244e defines the downstream end 244c of the tunnel channel 244a.

The upstream-end forming portion 244d is open downward along the vehicle up-down direction DR1. As such, the upstream-end forming portion 244d is open to the warm air passage 125.

The downstream-end forming portion 244e is open away from the upstream-end forming portion 244d. For example, the downstream-end forming portion 244e may be open substantially upward.

More specifically, the downstream-end forming portion 244e in the downstream space 127 is located away from a warm-air-passage junction where the downstream space 127 is connected to the warm air passage 125. For example, since the warm-air-passage junction is located in a lower area inside the downstream space 127, the downstream-end forming portion 244e is located in an upper area inside the downstream space 127.

The tunnel member 244 includes a rib 244f therein. The rib 244f is positioned in the tunnel channel 244a. The rib 244f in the tunnel channel 244a is positioned adjacent to the downstream end 244c of the tunnel channel 244a. For example, as shown in FIG. 3, the rib 244f extends along a flow direction of air flowing through the tunnel channel 244a.

Further, as shown in FIG. 3 and FIGS. 6 to 11, the tunnel member 244, in a cross section, has a flat shape extending longitudinally along the cool-air-passage connection direction DRc shown in FIG. 4. The upstream-end forming portion 244d of the tunnel member 244 is inserted into a downstream end portion of the warm air passage 125 from the downstream space 127.

As shown in FIG. 3, FIG. 6, FIG. 7 and FIG. 11, the blade 245 of the grid has a wing shape. Specifically, the blade 245 expands from the downstream-end forming portion 244e of the tunnel member 244 to both sides of the tunnel member 244 along the vehicle width direction DR3. The vehicle width direction DR3 is a width direction intersecting with both of the cool-air-passage connection direction DRc and the warm-air-passage connection direction DRh shown in FIG. 4.

The tunnel member 244 and the blade 245 of the grid 24 are arranged in the downstream space 127. As shown in FIG. 3, FIG. 6, FIG. 7 and FIG. 10, the tunnel member 244 occupies a part of an entire width of the downstream space 127 along the vehicle width direction DR3. Specifically, the tunnel member 244 is positioned substantially at the center of the downstream space 127 along the vehicle width direction DR3.

On the other hand, the blade 245 extends across the entire width of the downstream space 127 along the vehicle width direction DR3. For example, one end 245a and the other end 245b of the blade 245 in the vehicle width direction DR3 abut on an inner surface of the air conditioning case 12 facing the downstream space 127.

As such, the blade 245 divides the downstream space 127 as shown in FIG. 5. Specifically, the blade 245 divides the downstream space 127 to define two divided spaces 127a, 127b in the downstream space 127.

Here, partitioning the downstream space 127 by the blade 245 is not limited to partitioning the two divided spaces 127a, 127b completely. For example, the blade 245 divides the downstream space 127 roughly such that the two divided spaces 127a, 127b are not separated from each other completely.

Hereafter, one of the two divided spaces 127a, 127b will be referred to as a first divided space 127a. The first divided space 127a is proximate to the warm-air-passage junction where the warm air passage 125 is connected to the downstream space 127. The other of the two divided spaces 127a, 127b will be referred to as a second divided space 127b. That is, a portion of the downstream space 127 excluding the tunnel channel 244a is configured by the first divided space 127a and the second divided space 127b.

The first divided space 127a is positioned below the second divided space 127b with the blade 245 interposed therebetween. The first divided space 127a is open to each of the warm air passage 125, the cool air passage 126, and the door arrangement space 128. The second divided space 127b is open to both of the tunnel channel 244a defined in the grid 24 and the door arrangement space 128.

Figure 10:
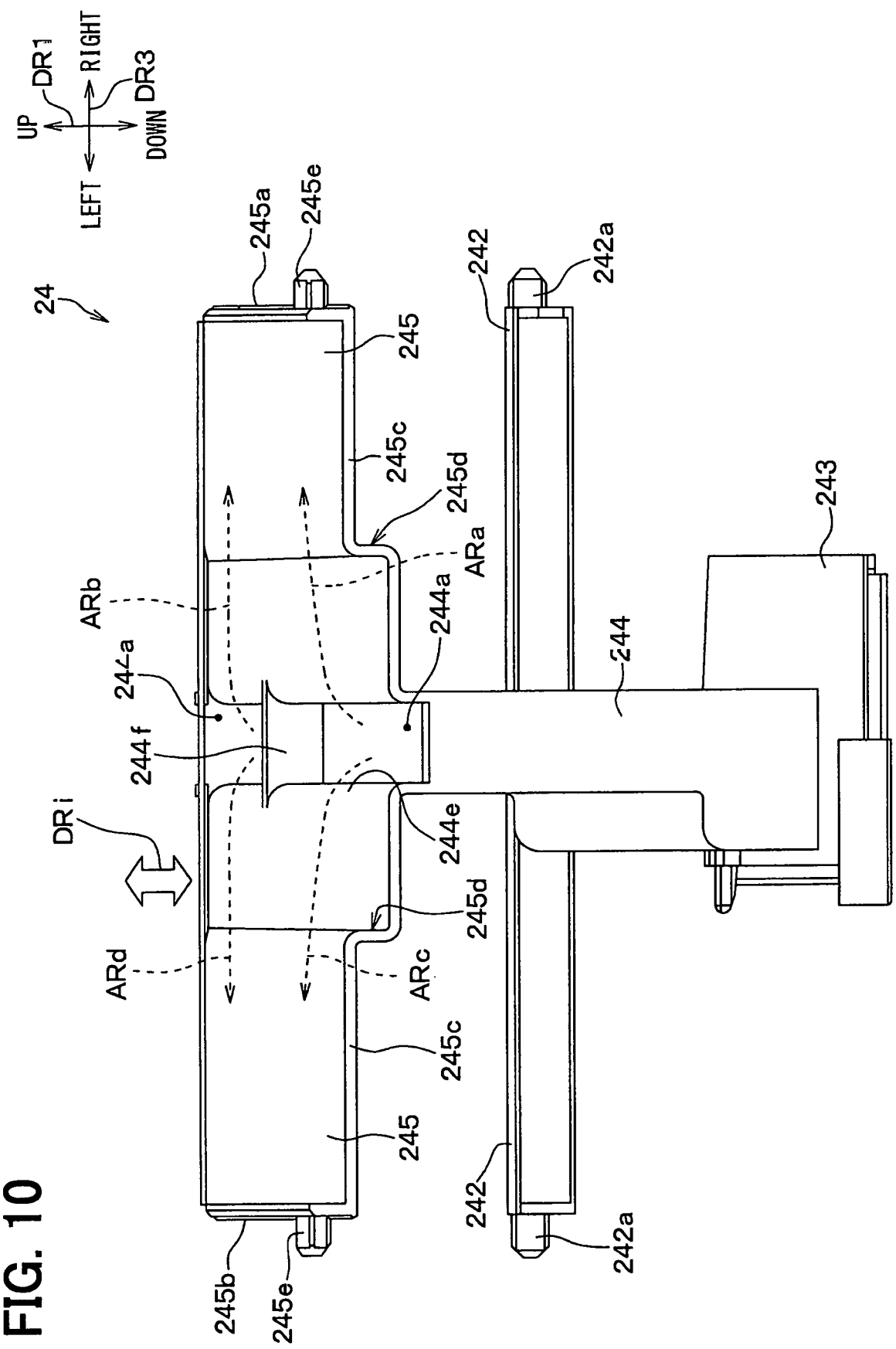
FIG. 10 is a diagram of the grid viewed along an orientation indicator X shown in FIG. 8, i.e., is a plan view of the grid.
Figure 11:
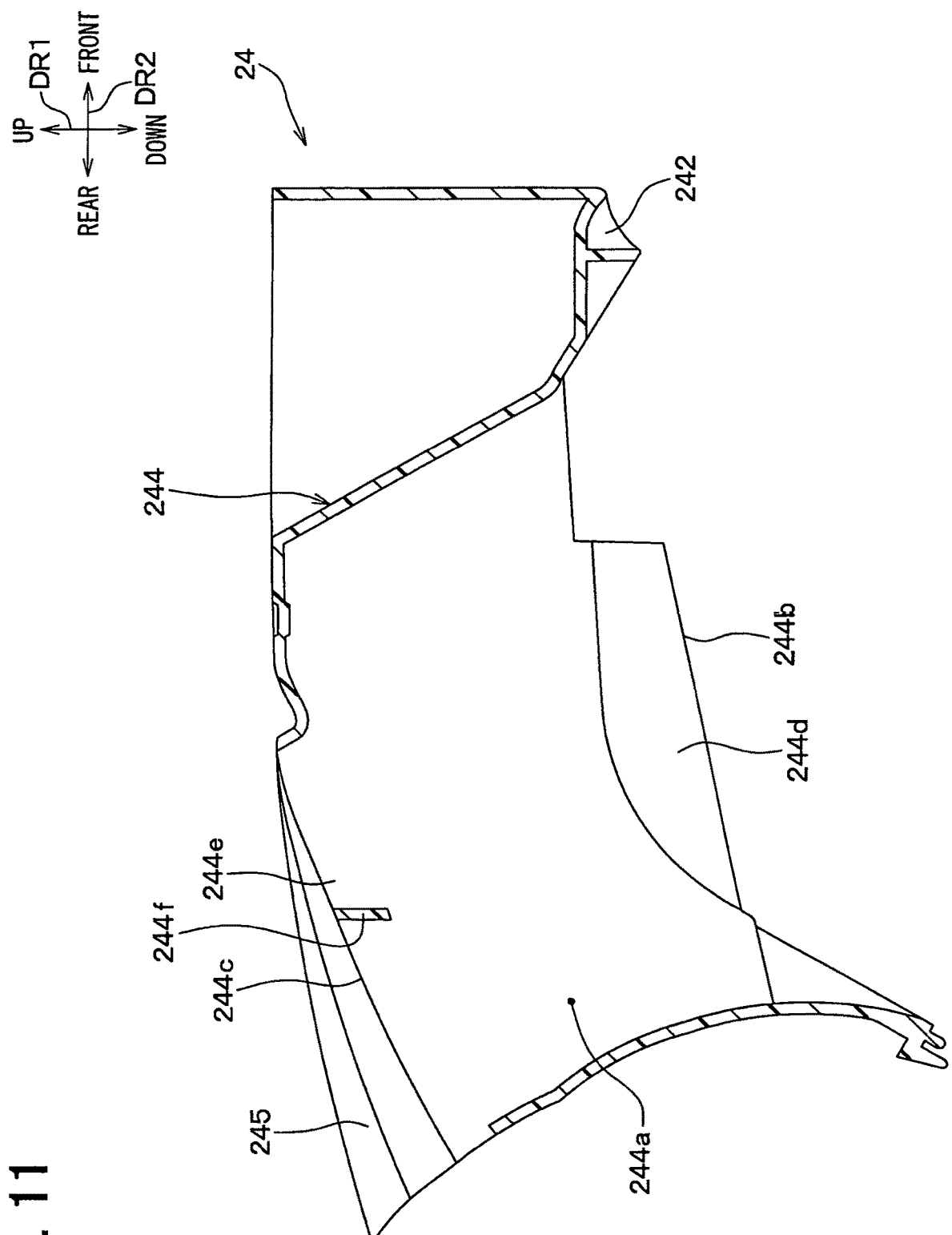
FIG. 11 is a cross-sectional view of the grid taken along a line XI-XI shown in FIG. 9, i.e., a cross-sectional view of the grid taken at a center of a tunnel channel defined in the grid.

As shown in FIG. 5 and FIG. 10, the tunnel member 244 of the grid 24 divides the first divided space 127a along the vehicle width direction DR3. That is, on a lower side of the blade 245 in the downstream space 127, the first divided space 127a corresponds to a total of a space, which is defined on one side of the tunnel member 244 in the vehicle width direction DR3, and a space, which is defined on the other side of the tunnel member 244 in the vehicle width direction DR3.

Further, as shown in FIG. 5, the second divided space 127b is formed in a wedge shape by the blade 245 of the grid 24 and the air conditioning case 12. That is, the second divided space 127b expands toward the door arrangement space 128 in the cool-air-passage connection direction DRc shown in FIG. 4.

The blade 245 of the grid 24 closes the second divided space 127b on a side of the second divided space 127b away from the door arrangement space 128. That is, the blade 245 closes a front end of the second divided space 127b in the vehicle front-rear direction DR2.

On the other hand, the blade 245 opens a rear end of the second divided space 127b in the vehicle front-rear direction DR2. That is, the second divided space 127b includes an open end 127c that is open to the door arrangement space 128.

As shown in FIG. 5 and FIG. 10, the blade 245 of the grid 24 has a stepped shape that forms a step in a space arrangement direction DRi along which the first divided space 127a and the second divided space 127b face each other. With this step shape, the blade 245 defines the second divided space 127b to expand along the space arranging direction DRi toward the downstream-end forming portion 244e of the tunnel member 244 in the vehicle width direction DR3. In short, the width of the second divided space 127b along the space arrangement direction DRi increases toward the center of the blade 245 in the vehicle width direction DR3.

In the second divided space 127b defined as described above, the blade 245 of the grid 24 guides the air, which flows from the downstream end 244c of the tunnel channel 244a, to diffuse along the vehicle width direction DR3 as shown by orientation indicators ARa, ARb, ARc, and ARd in FIG. 10.

Next, the state of the door arrangement space 128 when the air conditioning unit 10 for a vehicle is operated in the bi-level mode will be described.

When the blowing mode is the bi-level mode, the outlet door 22 opens both of the foot outlet 131 and the face outlet 132 as shown in FIG. 3 and FIG. 5. In that case, the outlet door 22 is at the bi-level mode position shown in FIG. 3 and FIG. 5. At the bi-level mode position, the outlet door 22 divides the door arrangement space 128 into a foot-outlet space 128a and a face-outlet space 128b. The foot-outlet space 128a is open to both of the foot outlet 131 and the first divided space 127a. The face-outlet space 128b is open to both of the face outlet 132 and the second divided space 127b.

Here, partitioning the door arrangement space 128 by the outlet door 22 is not limited to partitioning the two spaces 128a, 128b completely. For example, the outlet door 22 divides the door arrangement space 128 roughly such that the two spaces 128a, 128b are not separated from each other completely. In the present embodiment, as shown in FIG. 3 and FIG. 5, the outlet door 22 divides the door arrangement space 128 roughly at the bi-level mode position.

When the outlet door 22 is at the bi-level mode position, at least a part of the door edge 222a of the door body 222 faces a blade edge 245c of the blade 245 and a part of the open end 127c of the second divided space 127b along a radial direction of the rotary shaft 221 perpendicular to the door rotational axis CLd. For example, when the blowing mode is the bi-level mode, the outlet door 22 is positioned so that a position of the door edge 222a of the door body 222 in a circumferential direction of the rotary shaft 221 coincides with a position of a stepped portion 245d of the blade 245 shown in FIG. 10.

Next, a flow of air in the air conditioning case 12 will be described. As shown in FIGS. 3 and 5, when each of the warm air passage 125 and the cool air passage 126 is open and allows the air to pass therethrough, the air flowing out of the evaporator 16 flows into both the warm air passage 125 and the cool air passage 126.

The air flowing into the warm air passage 125 flows to the heater core 18 as shown by orientation indicator FH1. A part of the air (i.e., the warm air) passing through the heater core 18 and heated by the heater core 18 flows to the tunnel channel 244a of the grid 24 as shown by orientation indicator FH2a. At the same time, the rest of the warm air flows to the first divided space 127a as shown by orientation indicator FH2b.

The air flowing into the cool air passage 126 passes through the cool air passage 126 and then flows into the first divided space 127a as shown by orientation indicator FC1. At this time, since the cool air passage 126 is in communication with the first divided space 127a in the cool-air-passage connection direction DRc shown in FIG. 4, the air, i.e., the cool air, from the cool air passage 126 flows along the cool-air-passage connection direction DRc and flows into the first divided space 127a.

The cool air flowing from the cool air passage 126 and passing through the first divided space 127a flows toward the door arrangement space 128 as shown by orientation indicator FC2 in FIG. 5. At that time, in the first divided space 127a, the warm air, which flows into the first divided space 127a as shown by orientation indicator FH2b, is mixed with the cool air, which flows as shown by orientation indicator FC2. For example, in a region M1 shown FIG. 5, the warm air from the warm air passage 125 and the cool air from the cool air passage 126 are mixed with each other.

As a result of mixing the warm air and the cool air, a mixed air is provided. That is, the warm air from the warm air passage 125 and the cool air from the cool air passage 126 become the mixed air while passing through the first divided space 127a, and then flow into the door arrangement space 128 as shown by orientation indicator FC2.

On the other hand, the warm air flowing into the tunnel channel 244a passes upward through the tunnel channel 244a as shown by orientation indicator FHtn in FIG. 3, and then flows into the second divided space 127b. In the second divided space 127b, the warm air flowing from the tunnel channel 244a into the second divided space 127b is diffused to both sides in the vehicle width direction DR3 as shown by orientation indicators ARa, ARb, ARc, and ARd in FIG. 10, and then flows into the door arrangement space 128 as shown by orientation indicator FH3.

In the door arrangement space 128, the warm air, which flows from the second divided space 127b into the door arrangement space 128, joins the mixed air, which flows from the first divided space 127a into the door arrangement space 128. For example, in a region M2 shown in FIG. 5, the warm air from the second divided space 127b and the mixed air from the first divided space 127a are mixed with each other. Then, the mixed air is discharged into the vehicle compartment from at least one of the air outlets 131, 132 being open.

That is, the grid 24 guides the warm air, which flows through the warm air passage 125, to flow upward in the downstream space 127, and allows the warm air to join the mixed air, which flows from the first divided space 127a, while being diffused along the vehicle width direction DR3 in the upper portion of the downstream space 127.

As shown in FIG. 3 and FIG. 5, when the outlet door 22 is at the bi-level mode position, mixing the warm air from the second divided space 127b and the cool air from the first divided space 127a in the door arrangement space 128 is suppressed by the outlet door 22, as compared with a case where the outlet door 22 is at the face mode position or the foot mode position. For example, the mixed air from the first divided space 127a may flow to the foot outlet 131 easier than flowing to the face outlet 132. On the other hand, the warm air from the second divided space 127b may flow to the face outlet 132 easier than flowing to the foot outlet 131.

As described above, in the present embodiment, the tunnel member 244 and the blade 245 of the grid 24 are arranged in the downstream space 127. The upstream-end forming portion 244d of the tunnel member 244 is open to the warm air passage 125. The downstream-end forming portion 244e is open in a direction away from the upstream-end forming portion 244d. Further, the blade 245 expands from the downstream-end forming portion 244e of the tunnel member 244 to both sides of the downstream-end forming portion 244e along the vehicle width direction DR3. As such, the blade 245 guides the air, which flows out of the tunnel channel 244a from the downstream end 244c, to be diffused along the vehicle width direction DR3.

Therefore, the tunnel member 244 and the blade 245 can reduce the temperature variation of the air flowing out of the air conditioning unit 10 and can reduce the temperature difference of the air along the vehicle up-down direction DR1.

In addition, the blade 245 diffuses the air, which flows out of the tunnel channel 244a from the downstream end 244c, along the vehicle width direction DR3. As such, a plurality of narrow tunnel channels 244a may not be necessarily provided to reduce the temperature distribution. Therefore, a pressure loss caused in the air conditioning unit 12 due to the grid 24 can be prevented from increasing. In other words, a ventilation resistance in the grid 24 can be prevented from increasing.

Further, in the present embodiment, the blade 245 of the grid 24 defines the two divided spaces 127a, 127b in the downstream space 127 by partitioning the downstream space 127. The first divided space 127a, which is one of the two divided spaces 127a, 127b, is open to each of the warm air passage 125, the cool air passage 126, and the door arrangement space 128. The second divided space 127b, which is the other of the two divided spaces 127a, 127b, is open to both of the tunnel channel 244a of the grid 24 and the door arrangement space 128.

Therefore, the air from the cool air passage 126 hardly prevents the warm air, which flows from the tunnel channel 244a, from being diffused in the second divided space 127b. As such, the warm air diffused in the vehicle width direction DR3 in the second divided space 127b can be mixed with the mixed air from the first divided space 127a in the door arrangement space 128.

In the present embodiment, the second divided space 127b expands toward the door arrangement space 128 in the cool-air-passage connection direction DRc. Therefore, the second divided space 127b can be defined so that the air flows into the door arrangement space 128 from the second divided space 127b easily and so that the air hardly flows into the second divided space 127b from a side of the second divided space 127b away from the door arrangement space 128.

In the present embodiment, the blade 245 of the grid 24 closes the second divided space 127b on a side of the second divided space 127b away from the door arrangement space 128. Therefore, the air hardly flows into the second divided space 127b from a side of the second divided space 127b away from the door arrangement space 128.

In the present embodiment, the blade 245 defines the second divided space 127b to expand along the space arranging direction DRi toward the downstream-end forming portion 244e in the vehicle width direction DR3. Accordingly, in the vehicle width direction DR3, the portion of the second divided space 127b connected to the tunnel channel 244a is the widest, and the second divided space 127b gradually narrows in a direction along which the warm air from the tunnel channel 244a is diffused. As a result, the warm air flows easily, and the ventilation resistance can be reduced.

Further, in the present embodiment, the blade 245 has the stepped shape. As such, the blade 245, with a simple shape, can define the second divided space 127b to expand along the space arranging direction DRi toward the downstream-end forming portion 244e in the vehicle width direction DR3.

In the present embodiment, the outlet door 22 is positioned to divide the door arrangement space 128 into the foot-outlet space 128a and the face-outlet space 128b when opening both of the foot outlet 131 and the face outlet 132. Accordingly, the foot-outlet space 128a is open to each of the foot outlet 131 and the first divided space 127a. At the same time, the face-outlet space 128b is open to each of the face outlet 132 and the second divided space 127b. Therefore, the outlet door 22 can be positioned such that the air flows from the first divided space 127a to the foot outlet 131 easily and that the air flows from the second divided space 127b to the face outlet 132 easily.

In the present embodiment, the outlet door 22, when opening both of the foot outlet 131 and the face outlet 132, is positioned such that at least a part of the door edge 222a faces the blade edge 245c of the blade 245 and a part of the open end 127c of the second divided space 127b. As a result, even when the outlet door 22 moves from such position, a mixing ratio of the warm air in the face-outlet space 128b can be prevented from being changed exponentially. Thus, a comfort, i.e., a comfortable feeling, of an occupant can be prevented from deteriorating due to a drastic change of the temperature of the air discharged into the vehicle compartment, for example, by suppressing a drastic change of a temperature of the air discharged into the vehicle compartment from the face outlet 132.

Further, as described above, since the blade 245 has the stepped shape, the blade edge 245c of the blade 245 has a width corresponding to the step of the stepped shape in the circumferential direction of the door rotational axis CLd. Therefore, the above-described effect of preventing the comfort deterioration can be further enhanced as a synergistic effect with the blade 245 having the step shape.

In the present embodiment, the tunnel member 244 of the grid 24 includes the rib 244f that is positioned in the tunnel channel 244a and that is adjacent to the downstream end 244c of the tunnel channel 244a. Therefore, the rib 244f contributes to reducing wind noise or air column resonance noise caused by separation vortex of air that is possibly generated by a rapid expansion of an air flow path extending from the tunnel channel 244a to the second divided space 127b.

In addition, in the present embodiment, the rib 244f extends along the flow direction of air flowing through the tunnel channel 244a. Therefore, it is possible to suppress an increase in the ventilation resistance caused by the rib 244f.

Other Embodiments (1) In the above-described embodiment, the air conditioning unit 10 for a vehicle shown in FIG. 1 is specifically an air conditioning unit for a rear seat. However, the air conditioning unit 10 may not be limited to the air conditioning unit for a rear seat. The air conditioning unit 10 may be mounted in any areas in the vehicle. For example, the air conditioning unit 10 may be an air conditioning unit that is positioned in a front area of the vehicle compartment and that supplies the conditioned air from the instrument panel.

(2) In the above-described embodiment, the air conditioning unit 10 for a vehicle includes the evaporator 16. However, the air conditioning unit 10 for a vehicle may not include the evaporator 16, e.g., when the air conditioning unit 10 is used in an environment where it is not necessary to cool the air introduced into the air conditioning case 12.

(3) In the above-described embodiment, as shown in FIGS. 6, 7 and 10, the tunnel member 244 of the grid 24 is positioned substantially at the center of the downstream space 127 along the vehicle width direction DR 3. However, the tunnel member 244 may be positioned at the end of the downstream space 127. The quantity of the tunnel member 244 may be two or more. The optimum position, the quantity, and the width of the tunnel member 244 may be set as required based on the temperature variation of the conditioned air and the temperature difference along the vehicle up-down direction DR 1.

(4) In the above-described embodiment, the blade 245 of the grid 24 has the stepped shape as shown in FIG. 10, and the number of the step thereof is one for each of the left and right sides. However, the number of the step is not limited to a specific quantity. Alternatively, the blade 245 may not have a stepped shape. A height of the step, a position, a quantity of the step of the blade 245 may be set as required based on the temperature variation of the conditioned air and the temperature difference along the vehicle up-down direction DR 1. For example, it is preferable that the width of the second divided space 127b along the arrangement direction DRi shown in FIG. 5 may be increased as approaching the center in the vehicle width direction DR3.

Alternatively, the blade 245 of the grid 24 may not have the stepped shape. For example, the width (i.e., a position) of the blade 245 in the vehicle up-down direction DR1 may change continuously so that the width of the second divided space 127b in the arrangement direction DRi may increase as approaching the center of the blade 245 along the vehicle width direction DR3. In that case, the shape of the blade 245 may be set as required based on the temperature variation of the conditioned air and the temperature difference along the vehicle up-down direction DR1.

(5) In the above-described embodiment, the blade 245 of the grid 24 has a substantially symmetrical shape along the vehicle width direction DR3, however the shape is not limited to be symmetrical and may be asymmetrical.

(6) In the above-described embodiment, the outlet door 22 is a cantilever rotating door in which the rotary shaft 221 is attached to one end of the door body 222. However, for example, the outlet door 22 may be a butterfly door with the rotary shaft 221 attached to a center portion of the door body 222. Such configuration may be applied to the air mix door 20.

The foregoing description of the embodiments has been provided for purposes of illustration and description. It is not intended to be exhaustive or to limit the disclosure. The present disclosure is intended to cover various modification and equivalent arrangements. Individual elements or features of a particular embodiment are not necessarily essential unless it is specifically stated that the elements or the features are essential in the foregoing description, or unless the elements or the features are obviously essential in principle.

A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

CONCLUSION

According to a first aspect described through a part or a whole of the above-described embodiments, the upstream-end forming portion of the tunnel member is open to the warm air passage, and the downstream-end forming portion of the tunnel member is open in a direction opposite to the direction along which the upstream-end forming portion is open. The blade extends from the downstream-end forming portion to both sides along the width direction, and guides the air, which flows out of the tunnel channel from the downstream end, to diffuse along the width direction.

According to a second aspect, the blade divides the first space into the two divided spaces. One of the two divided spaces, which is defined in the first space and is adjacent to the warm air passage, is in communication with each of the cool air passage, the warm air passage, and the second space. The other of the two divided spaces is in communication with each of the tunnel channel and the second space. As such, the air from the cool air passage hardly prevents the warm air, which flows from the tunnel channel, from being diffused in the second divided space. In the second space, the air, which is diffused along the width direction in the other divided space, can join the air flowing from the cool air passage into the one divided space.

According to a third aspect, the other divided space expands along one direction as approaching the second space. Therefore, the other divided space can be defined so that the air flows into the second space from the other divided space easily and so that the air hardly flows into the other divided space from a side of the other divided space away from the second space.

According to a fourth aspect, the blade closes the other divided space on a side of the other divided space away from the second space. Therefore, the air hardly flows into the other divided space from the side of the other divided space away from the second space.

According to a fifth aspect, the blade defines the other divided space so that the other divided space expands along the arrangement direction, along which the two divided space face each other, as approaching the downstream-end forming portion in the width direction. Accordingly, in the vehicle width direction, the portion of the other divided space connected to the tunnel channel is the widest, and the other divided space gradually narrows in a direction along which the warm air from the tunnel channel is diffused. As a result, the warm air flows easily, and the ventilation resistance can be reduced.

According to a sixth aspect, the blade has the stepped shape. As such, the blade, with a simple shape, can define the other divided space to expand along the arranging direction as approaching the downstream-end forming portion along the vehicle width direction.

According to a seventh aspect, the second space door, when opening both of the first air outlet and the second air outlet, is positioned to partition a space, which is open to the first air outlet and the one divided space, from a space, which is open to the second air outlet and the other divided space. Therefore, the second space door can be positioned such that the air flows from the one divided space to the first air outlet easily and that the air flows from the other divided space to the first air outlet easily.

According to an eighth aspect, the second space door, when opening both of the first air outlet and the second air outlet, is positioned such that at least a part of the door edge faces the edge of the blade and a part of the open end of the other divided space. As a result, even when the second space door moves from such position, a mixing ratio of the warm air in the space opening to both of the second air outlet and the other divided space can be prevented from being changed exponentially. Thus, a comfort of an occupant can be prevented from deteriorating due to a drastic change of the temperature of the air discharged into the vehicle compartment, for example, by suppressing a drastic change of a temperature of the air discharged into the vehicle compartment from the second air outlet.

The eighth aspect provides such effects. In addition, when the blade has the stepped shape described in the sixth aspect, the edge of the blade has a width corresponding to the step of the stepped shape in the circumferential direction of the longitudinal axis. Therefore, the above-described effect of preventing the comfort deterioration can be further enhanced as a synergistic effect with the sixth aspect and the eighth aspect.

According to a ninth aspect, the tunnel member includes a rib in the tunnel channel, and the rib is positioned adjacent to the downstream end of the tunnel channel. As such, the rib contributes to reducing wind noise or air column resonance noise caused by separation vortex of air that is possibly generated by a rapid expansion of an air flow path extending from the tunnel channel to the other divided space.

According to a tenth aspect, the rib extends along a flow direction of air flowing through the tunnel channel. Therefore, it is possible to suppress an increase in the ventilation resistance caused by the rib.

What is claimed is:

1. An air conditioning unit that is configured to perform an air conditioning for a vehicle compartment, comprising:
   an air conditioning case that defines a warm air passage, a cool air passage, a first space, and a second space therein,
      the warm air passage allowing air to flow therethrough and to be heated in a heater,
      the cool air passage allowing air to flow therethrough while bypassing the heater,
      the first space defined on a downstream side of the warm air passage and on a downstream side of the cool air passage,
      the warm air passage and the cool air passage being connected to each other in the first space, and
      the second space being connected to the first space; and
   a case interior member in the air conditioning case, wherein
   the cool air passage is in communication with the first space in one direction,
   the warm air passage is in communication with the first space in an other direction intersecting with the one direction,
   the second space is connected to the first space on a side of the first space away from the cool air passage,
   the air flowing out of the first space is discharged into the vehicle compartment via the second space,
   the case interior member includes
      a tunnel member that defines a tunnel channel therein passing through the tunnel member along a direction intersecting with the one direction and
      a blade,
   the tunnel member and the blade are positioned in the first space,
   the tunnel member includes
      an upstream-end forming portion that includes an upstream end of the tunnel channel and
      a downstream-end forming portion that includes a downstream end of the tunnel channel,
   the upstream-end forming portion is open to the warm air passage,
   the downstream-end forming portion is open in a direction away from the upstream-end forming portion,
   the blade extends from the downstream-end forming portion to both sides along a width direction intersecting with both of the one direction and the other direction, and guides the air, which flows out of the tunnel channel from the downstream end, to diffuse along the width direction,
   the blade divides the first space into two divided spaces including a first divided space and a second divided space,
   the first divided space in the first space is adjacent to the warm air passage and is in communication with each of the cool air passage, the warm air passage, and the second space,
   the second divided space in the first space is in communication with both of the tunnel channel and the second space, and
   the blade is tilted to be spaced away from the air conditioning case in a direction toward the second space such that the second divided space gradually expands along the one direction toward the second space.

2. The air conditioning unit for a vehicle according to claim 1, wherein the blade closes a side of the second divided space opposite to the second space.

3. The air conditioning unit for a vehicle according to claim 1, wherein
   the first divided space and the second divided space are arranged in an arrangement direction, and
   the blade expands the second divided space along the arrangement direction toward the downstream-end forming portion.

4. The air conditioning unit for a vehicle according to claim 3, wherein the blade has a stepped shape.

5. The air conditioning unit for a vehicle according to claim 1, further comprising
   a second space door in the second space, wherein
   the air conditioning case includes a first air outlet and a second air outlet that each are configured to discharge the air into the vehicle compartment,
   the second space door is configured to open and close the first air outlet and the second air outlet selectively, and
   when the second space door opens both of the first air outlet and the second air outlet, the second space door is at a position where the second space door divides the second space into a space being in communication with both of the first air outlet and the first divided space and a space being in communication with both of the second air outlet and the second divided space.

6. The air conditioning unit for a vehicle according to claim 5, wherein
   the second divided space includes an open end and is in communication with the second space through the open end,
   the second space door includes a door body that is a plate in shape and that is configured to rotate about a door rotational axis parallel to the width direction,
   the door body includes a door edge that is positioned between the door rotational axis and the first space, and
   when the second space door opens both of the first air outlet and the second air outlet, at least a part of the door edge faces a blade edge of the blade and a part of the open end.

7. The air conditioning unit for a vehicle according to claim 1, wherein the tunnel member includes a rib in the tunnel channel, and the rib is positioned adjacent to the downstream end of the tunnel channel.

8. The air conditioning unit for a vehicle according to claim 7, wherein the rib extends along a flow direction of air flowing through the tunnel channel.

* * * * *